US012784528B2

(12) United States Patent
Sergi et al.

(10) Patent No.: US 12,784,528 B2
(45) Date of Patent: Nov. 3, 2026

(54) PROCESS FOR SELF-RECOVERING FROM DOCUMENT PROCESSING DISTURBANCES

(71) Applicant: ARCA TECHNOLOGIES S.R.L., Bollengo (IT)

(72) Inventors: Leonardo Sergi, Bollengo (IT); Elisabetta Carisio, Bollengo (IT); Diego Vescovo, Bollengo (IT); Samuele Libetti, Bollengo (IT)

(73) Assignee: SESAMI TECHNOLOGIES S.R.L., Bollengo (IT)

( * ) Notice: Subject to any disclaimer, the term of this patent is extended or adjusted under 35 U.S.C. 154(b) by 506 days.

(21) Appl. No.: 18/519,761

(22) Filed: Nov. 27, 2023

(65) Prior Publication Data

US 2024/0212412 A1 Jun. 27, 2024

(30) Foreign Application Priority Data

Dec. 21, 2022 (IT) ........................ 102022000026247

(51) Int. Cl.
*G07D 11/30* (2019.01)
*G07D 7/0047* (2016.01)
(Continued)

(52) U.S. Cl.
CPC ........... *G07D 11/30* (2019.01); *G07D 7/0047* (2017.05); *G07D 11/13* (2019.01); *G07D 11/24* (2019.01);
(Continued)

(58) Field of Classification Search
CPC ...... G07D 11/30; G07D 7/0047; G07D 11/13; G07D 11/24; G07D 11/32; G07D 11/34;
(Continued)

(56) References Cited

U.S. PATENT DOCUMENTS

2009/0001157 A1 1/2009 Buntscheck et al.
2009/0229947 A1 9/2009 Takai et al.
(Continued)

FOREIGN PATENT DOCUMENTS

WO 2016063589 4/2016

OTHER PUBLICATIONS

Ministry of Business and Made in Italy, Search Report for International Patent Application No. IT102022000026247, Jun. 28, 2023.

*Primary Examiner* — Jeffrey A Shapiro
(74) *Attorney, Agent, or Firm* — Williams Mullen; R. Brian Drozd

(57) ABSTRACT

A process for self-recovering from document processing disturbances in a flexible document receiving and dispensing device comprising one or more flexible document storing and dispensing modules, wherein each one of said one or more flexible document storing and dispensing modules is configured to store a respective group of flexible documents, wherein each flexible document is individually identified by a univocal code associated thereto, wherein the process comprises the following steps:

A. during a storing operation, one or more flexible documents are stored according to the following substeps:
   A.1 recognizing the group of flexible documents and reading the univocal code from each one of said one or more flexible documents; and
   A.2 for each group of flexible documents, storing the univocal codes read at step A.1 in a memory unit of the respective flexible document storing and dispensing module, whereby such univocal codes are stored in a code storage sequence univocally associated to an expected code dispensing sequence including one or more expected univocal codes:
B. during a dispensing operation, for each one of one or more flexible documents to be dispensed, performing the following substeps:

(Continued)

B.1 reading the univocal code from the flexible document to be dispensed,
B.2 comparing the univocal code read at step B.1 with the expected univocal code in the expected code dispensing sequence:
B.3 when the compared codes are different, discarding flexible documents from the respective flexible document storing and dispensing module until it is recognized that a subsequence of discarded flexible documents is identical to a subsequence of expected univocal codes, otherwise
B.4 dispensing the flexible document.

16 Claims, 2 Drawing Sheets

(51) Int. Cl.

| | |
|---|---|
| ***G07D 11/13*** | (2019.01) |
| ***G07D 11/24*** | (2019.01) |
| ***G07D 11/32*** | (2019.01) |
| ***G07D 11/34*** | (2019.01) |
| ***G07D 11/36*** | (2019.01) |
| ***G07D 11/40*** | (2019.01) |

(52) U.S. Cl.
CPC ............. *G07D 11/32* (2019.01); *G07D 11/34* (2019.01); *G07D 11/36* (2019.01); *G07D 11/40* (2019.01); *G07D 2207/00* (2013.01); *G07D 2211/00* (2013.01)

(58) Field of Classification Search
CPC .... G07D 11/36; G07D 11/40; G07D 2207/00; G07D 2211/00; G07D 7/12
USPC .......................................................... 194/207
See application file for complete search history.

(56) References Cited

U.S. PATENT DOCUMENTS

| | | | | |
|---|---|---|---|---|
| 2013/0001039 | A1 | 1/2013 | Mizushima et al. | |
| 2013/0046407 | A1 | 2/2013 | Tomizawa et al. | |
| 2014/0144750 | A1 | 5/2014 | Shimizu et al. | |
| 2016/0335830 | A1 | 11/2016 | Wakabayashi et al. | |
| 2016/0364937 | A1 | 12/2016 | Neuhauser | |
| 2023/0138831 | A1* | 5/2023 | Baek | G06F 16/435 707/769 |

* cited by examiner

PROCESS FOR SELF-RECOVERING FROM DOCUMENT PROCESSING DISTURBANCES

CROSS REFERENCE TO RELATED APPLICATION

This application is based on Italian patent application IT102022000026247 filed on Dec. 21, 2022, the entire disclosure of which is incorporated herein by way of reference.

FIELD OF INVENTION

The present invention relates to a process for self-recovering from document processing disturbances in a flexible document receiving and dispensing device comprising one or more flexible document storing and dispensing modules, wherein each one of said one or more flexible document storing and dispensing modules is configured to store a respective group of flexible documents, such as banknotes and paper documents, that allows in a simple, reliable and effective way to recovery from any misplacement of the flexible documents during document processing, such as jams in storing or dispensing operation and manual insertion of flexible documents into or withdrawal of one or more flexible documents from any of the flexible document storing and dispensing modules which causes uncertainty on the number of flexible documents currently stored in the flexible document storing and dispensing module concerned.

In the following of the present description, reference will be mainly made to banknotes as flexible documents. However, it should be noted that the process for self-recovering from document processing disturbances according to the invention, as well the related flexible document storing and dispensing module and flexible document receiving and dispensing device, are applicable to any other type of flexible documents, including paper documents such as checks, notes, certificates and licenses, still remaining within the scope of protection of the present invention defined by the attached claims.

BACKGROUND OF THE INVENTION

Equipment for automatic deposit and withdrawal of banknotes are used not only in banking sites but also in retail sites, as help for teller or as customer-operated machine.

This kind of equipment includes banknote storing and dispensing modules, having function of recycling, each one being removably mountable within a respective housing so as to allow replacement, wherein each module is provided with a seat associated to a given type of banknotes, also depending on the size thereof. In particular, each module can include a storage cassette where the stored banknotes are stacked or a storage roller onto which the stored banknotes are wrapped.

The number of employed housings and modules determines denominations and/or types of banknotes to be handled, as well as dimensions and cost of the equipment.

During storing and dispensing banknotes, banknote processing disturbances can occur. For instance, jams in storing or dispensing operation, such as when banknotes overlap, can be detected in prior art equipment by means of sensors distributed along the banknote transport path. Other banknote processing disturbances include the case where an operator unduly manually insert banknotes in a storage cassette or manually withdraws banknotes therefrom.

Prior art equipment suffers from the drawback that, when banknote processing disturbances occur, the number of banknotes currently stored in the banknote storing and dispensing module is uncertain. In this case, an operator needs to manually remove all the banknote from the banknote storing and dispensing module affected by the disturbance and to re-store them therein. This operator's intervention takes long time, during which the equipment is not available for normal operation, and it also entails manipulations of the equipment and its modules that may cause wear and possible damages.

Some prior art equipment has been proposed to solve such problems, like those disclosed in documents US2009001157A1, US2009229947A1, US2013001039A1, US2013046407A1, US2016364937A1, WO2016063589A1 and US2016335830A1 the disclosures of which are incorporated by reference in their entireties. However, even these prior art equipment entail long operator intervention to recover from banknote processing disturbances.

It is an object of this invention, therefore, to allow in a simple, reliable and effective way to recovery from document processing disturbances in a flexible document receiving and dispensing device comprising one or more flexible document storing and dispensing modules, ensuring the consistency of the flexible document stored, saving operator's intervention time, reducing the risk of damages and wear for the device.

SUMMARY OF THE INVENTION

It is specific subject matter of the present invention a process for self-recovering from document processing disturbances in a flexible document receiving and dispensing device comprising one or more flexible document storing and dispensing modules, wherein each one of said one or more flexible document storing and dispensing modules is configured to store a respective group of flexible documents, wherein each flexible document is individually identified by a univocal code associated thereto, wherein the process comprises the following steps:

A. during a storing operation wherein one or more flexible documents are stored in at least one respective flexible document storing and dispensing module of said one or more flexible document storing and dispensing modules, wherein said one or more flexible documents are stored according to the following sub steps:
   - A.1 recognizing the group to which each one of said one or more flexible documents belongs and reading the univocal code from each one of said one or more flexible documents: and
   - A.2 for each group of flexible documents recognized at step A.1, storing the univocal codes read at step A.1 from said one or more flexible documents in a memory unit of the respective flexible document storing and dispensing module, whereby the univocal codes read at step A.1 from said one or more flexible documents are stored in a code storage sequence univocally associated to an expected code dispensing sequence including one or more expected univocal codes, thereby, for the respective flexible document storing and dispensing module of each group of flexible documents recognized at step A.1, the univocal code stored in every code position in said code storage sequence is univocally associated to an expected univocal code in a corresponding expected code position of the expected code dispensing sequence, whereby the code storage sequence and the expected code dispensing sequence for the respective flexible document storing and dispensing module of each group of flexible documents recognized at step A.1 are progressively populated with the univocal codes read at step A.1 for one or more flexible documents of the respective group of flexible documents:

B. during a dispensing operation wherein one or more flexible documents of a group of flexible documents are to be dispensed from the respective flexible document storing and dispensing module, for each one of said one or more flexible documents to be dispensed, performing the following sub steps:

B.1 reading the univocal code from the flexible document to be dispensed, thereby the univocal codes of said one or more flexible documents to be dispensed are read according to a code reading sequence, B.2 comparing the univocal code read at step B.1 with a reference univocal code that is the expected univocal code in the position of the expected code dispensing sequence corresponding to the position of the univocal code read at step B.1 in the code reading sequence:

B.3 when the comparison at step B.2 results in the univocal code read at step B.1 being different from the expected univocal code, discarding flexible documents from the respective flexible document storing and dispensing module, by reading the univocal codes of the discarded flexible documents, until it is recognized that a subsequence of N univocal codes read from the discarded flexible documents, with N≥3, is identical to a subsequence of N expected univocal codes in the expected code dispensing sequence starting from a position following the position corresponding to the position of the univocal code read at step B.1 in the code reading sequence, and in the case where discarding is terminated returning to step B.1, otherwise B.4 when the comparison at step B.2 results in the univocal code read at step B.1 being equal to the expected univocal code, dispensing the flexible document, deleting both said expected univocal code from the expected code dispensing sequence and the univocal code stored in said code storage sequence that is univocally associated to said deleted expected univocal code, and returning to step B.1.

According to another aspect of the invention, N can be not larger than 5, i.e. N≤5.

According to a further aspect of the invention, step B.3, when the comparison at step B.2 results in the univocal code read at step B.1 being different from the expected univocal code, can be executed for a maximum number M of flexible documents stored in the respective flexible document storing and dispensing module, wherein M is larger than N, i.e. M>N, optionally not larger than 20, i.e. M≤20, more optionally not larger than 10, i.e. M≤10.

According to an additional aspect of the invention, when at step B.3 it is recognized that no subsequence of N univocal codes read from the discarded flexible documents is identical to a subsequence of N expected univocal codes in the expected code dispensing sequence starting from a position following the position corresponding to the position of the univocal code read at step B.1 in the code reading sequence, the dispensing operation can be terminated.

According to another aspect of the invention, the process can further include, when at step B.3 it is recognized that a subsequence of N univocal codes read from the discarded flexible documents is identical to a subsequence of N expected univocal codes in the expected code dispensing sequence starting from a position following the position corresponding to the position of the univocal code read at step B.1 in the code reading sequence, the following step:

C. storing said discarded flexible documents back in at least one respective flexible document storing and dispensing module of said one or more flexible document storing and dispensing modules, wherein said discarded flexible documents are stored according to the following sub steps:

C.1 recognizing the group to which each one of said discarded flexible documents belongs and reading the univocal code from each one of said discarded flexible documents: and C.2 for each group of flexible documents recognized at step C.1, storing the univocal codes read at step C.1 from said discarded flexible documents in a memory unit of the respective flexible document storing and dispensing module, whereby, the univocal codes read at step C.1 from said discarded flexible documents are stored in said code storage sequence univocally associated to said expected code dispensing sequence, thereby, for the respective flexible document storing and dispensing module of each group of discarded flexible documents recognized at step C.1, said code storage sequence and said expected code dispensing sequence for the respective flexible document storing and dispensing module of each group of discarded flexible documents recognized at step C.1 are progressively populated with the univocal codes read at step C.1 for the discarded flexible documents of the respective group of flexible documents.

According to a further aspect of the invention, said flexible documents can comprise or consist of banknotes.

According to an additional aspect of the invention, said univocal codes can comprise or consist of banknote serial numbers printed on said banknotes.

It is also specific subject matter of the present invention a flexible document storing and dispensing module, configured to store in and dispense from a storage unit a group of flexible documents under control of an external processing unit, wherein each one of said flexible documents is individually identified by a univocal code associated thereto, wherein the flexible document storing and dispensing module includes a memory unit that:

during a storing operation wherein one or more flexible documents are stored in said flexible document storing and dispensing module, said memory unit is configured to receive the univocal code of each one of said one or more flexible documents and to store the univocal codes of said one or more flexible documents in a code storage sequence univocally associated to an expected code dispensing sequence including one or more expected univocal codes, thereby the univocal code stored in every code position in said code storage sequence is univocally associated to an expected univocal code in a corresponding expected code position of the expected code dispensing sequence, whereby the code storage sequence and the expected code dispensing sequence are progressively populated with the received univocal codes of said one or more flexible documents: and during a dispensing operation wherein one or more flexible documents are to be dispensed from the flexible document storing and dispensing module, for each one of said one or more flexible documents to be dispensed, said memory unit is configured to be accessed to output the expected univocal codes of the expected code dispensing sequence and to delete both said expected univocal codes from the expected code dispensing sequence and the univocal codes stored in said code storage sequence which are univocally associated to each other.

According to another aspect of the invention, said memory unit can be configured to receive the univocal code of each one of said at least N flexible documents from a reading device or said external processing unit.

According to a further aspect of the invention, said flexible documents can comprise or consist of banknotes.

According to an additional aspect of the invention, said univocal codes can comprise or consist of banknote serial numbers printed on said banknotes.

According to another aspect of the invention, said storage unit can comprise or consist of a storage cassette configured to store said flexible documents in at least one stack.

According to a further aspect of the invention, said storage unit can comprise or consist of at least one storage roller configured to store said flexible documents wrapped onto the storage roller.

It is further specific subject matter of the present invention a flexible document receiving and dispensing device comprising:

- a top body assembly configured to receive and dispense flexible documents including at least one reading device, and
- a bottom body assembly configured to store flexible documents, the bottom body assembly comprising a safe having one or more lodgments and a transport mechanism for storing and dispensing flexible documents,
- wherein said one or more lodgments include respective one or more flexible document storing and dispensing modules, each of which is the flexible document storing and dispensing module as previously described, wherein the flexible document receiving and dispensing device further comprises a processing unit operatively connected to said at least one reading device and to said memory unit of said at least one of said one or more flexible document storing and dispensing modules, wherein the flexible document receiving and dispensing device is configured to execute, under control of said processing unit, the process for self-recovering from document processing disturbances in a flexible document receiving and dispensing device as illustrated above.

According to another aspect of the invention, the flexible document receiving, and dispensing device can further comprise a recycling station within which said processing unit is configured to execute step B and the sub step C.1 of the process for self-recovering from document processing disturbances in one or more flexible document storing and dispensing modules as illustrated above.

The advantages offered by the invention are evident.

In fact, the process according to the invention allows in a simple, reliable and effective way to recovery from document processing disturbances in a flexible document receiving and dispensing device comprising one or more flexible document storing and dispensing modules.

Also, the process according to the invention ensures the consistency of the flexible document stored in each flexible document storing and dispensing module of the flexible document receiving and dispensing device, saving operator's intervention time.

Furthermore, by greatly reducing the manual interventions of operators on the flexible document receiving and dispensing device to recover from document processing disturbances, the process according to the invention reduces the risk of damages and wear for the device and its modules.

BRIEF DESCRIPTION OF THE DRAWINGS

The present invention will will be now described, by way of illustration and not by way of limitation, according to its preferred embodiments, by particularly referring to the Figures of the attached drawings, in which.

DETAILED DESCRIPTION OF THE PREFERRED EMBODIMENTS

Figure 1:
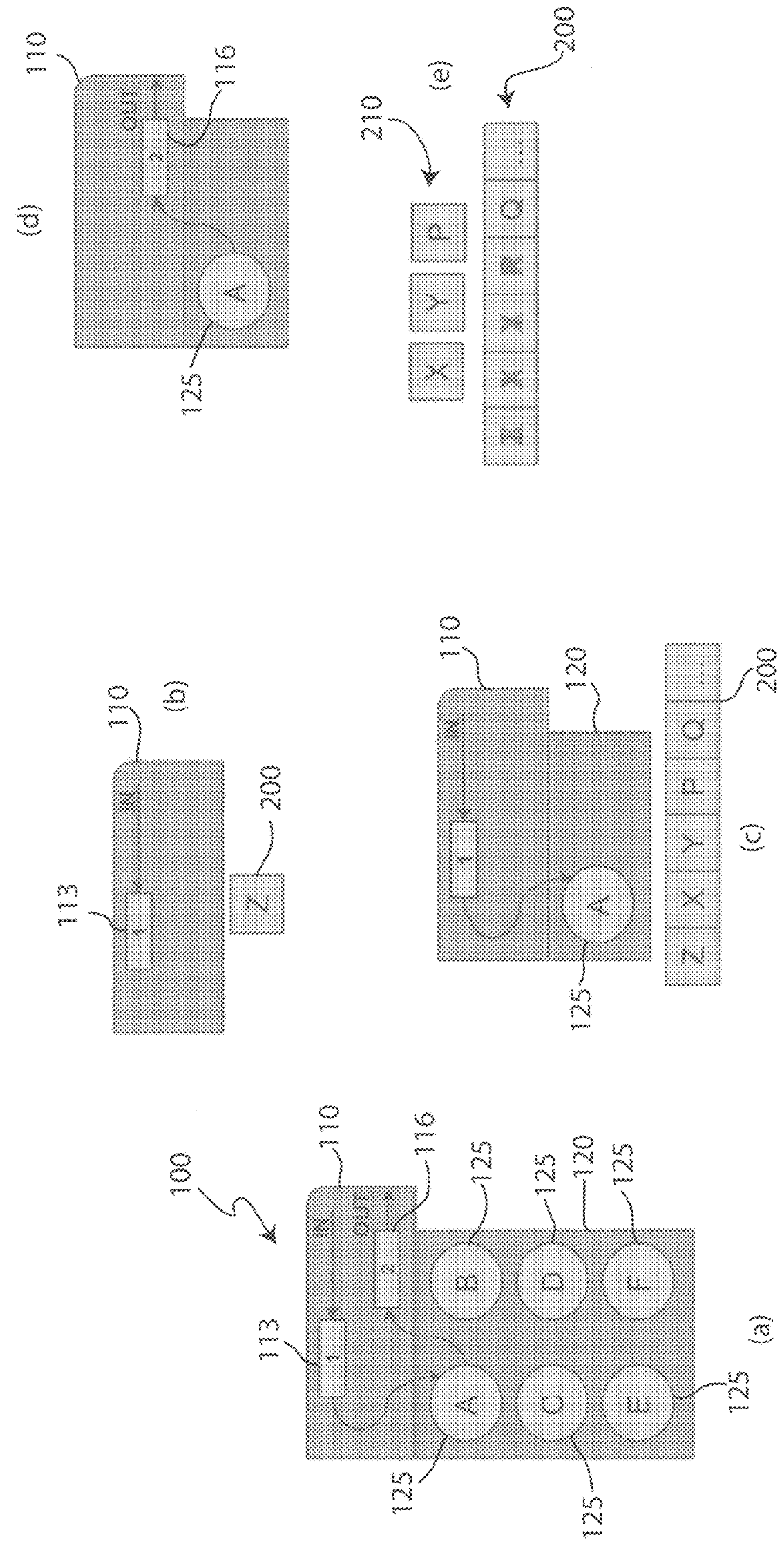
FIG. 1 shows a schematic view of the preferred embodiment of the process according to the invention applied to a banknote receiving and dispensing device.

With reference to FIG. 1*a*, the preferred embodiment of the process for self-recovering from document processing disturbances according to the invention is executed by a banknote receiving and dispensing device 100 comprising a top body assembly 110 for receiving and dispensing banknotes including two reading devices, namely an input reading device 113 configured to read the serial number of a banknote that is to be stored in the banknote receiving and dispensing device 100 and an output reading device 116 configured to read the serial number of a banknote that is to be dispensed by the banknote receiving and dispensing device 100.

The banknote receiving and dispensing device 100 also comprises a bottom body assembly 120 for storing banknotes that comprises a safe having six lodgments and a transport mechanism for storing and dispensing banknote. In particular, said six lodgments include respective six banknote storing and dispensing modules 125A-125F, each of which is configured to store a respective group of banknotes, e.g., a respective denominations or types of banknotes. Each one of said banknote is individually identified by a serial number printed onto the same banknote. Each one of said six banknote storing and dispensing modules 125A-125F includes a storage unit that comprises or consists of a storage cassette, configured to store said banknotes in at least one stack, or that comprises or consists of at least one storage roller configured to store said banknotes wrapped onto the storage roller.

The banknote receiving and dispensing device 100 further comprises a processing unit, not shown in the Figures, operatively connected to the input reading device 113 and to the output reading device 116.

Each one of the six banknote storing and dispensing modules 125A-125F comprises a memory unit operatively connected to the processing unit of the banknote receiving and dispensing device 100.

It must be noted that other embodiments of the banknote receiving and dispensing device according to the invention may comprise only one reading device arranged in a section of the banknote transport path that is run by the banknotes during both the storing and dispensing operations, still remaining within the scope of protection of the attached claims.

Figure 2:
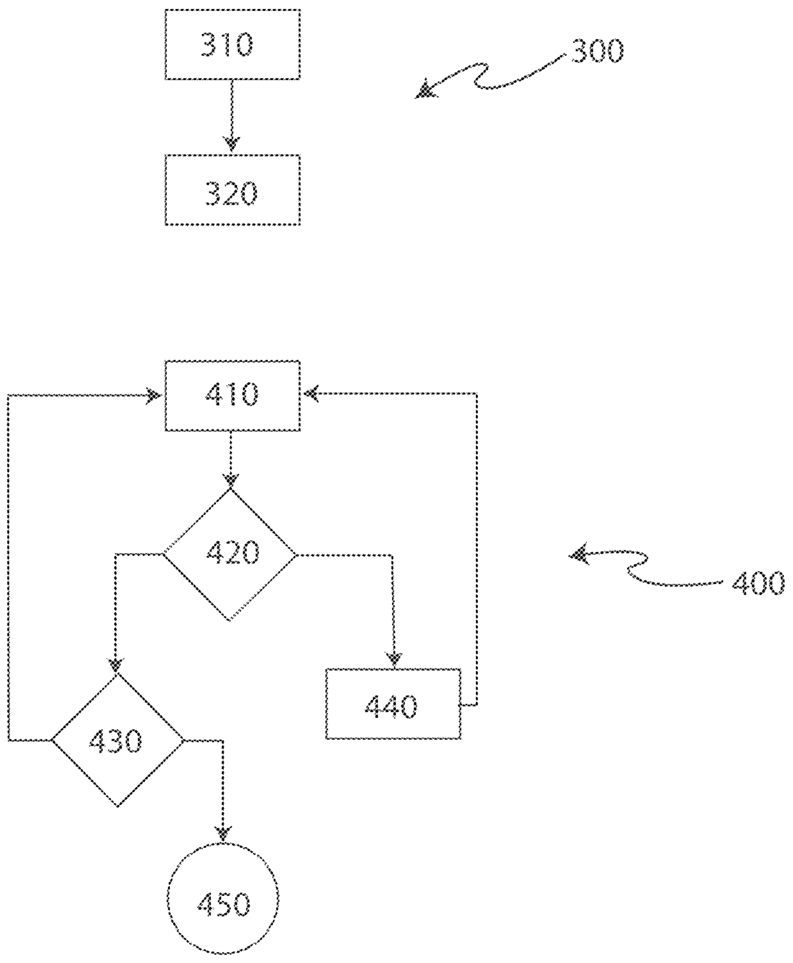
FIG. 2 shows a schematic flow chart of the process of FIG. 1.

Making reference to FIG. 1*a* and FIG. 2, it is possible to observe a storing operation 300 of the preferred embodiment of the process for self-recovering from document processing disturbances according to the invention, wherein one or more banknotes are stored in the six banknote storing and dispensing modules 125A-125F according to the groups to which the banknotes belong, e.g. on the basis of the denominations thereof.

At step 310, for each banknote entering the banknote receiving and dispensing device 100 at the top body assembly 110, on the basis of data sensed by the input reading device 113, and possibly by other sensors, the processing unit of the banknote receiving and dispensing device 100 recognizes the group to which each one of said banknotes belongs: also, the input reading device 113 reads the serial number of the entering banknote. In other words, the banknote receiving and dispensing device 100 reads sequentially the serial numbers of the banknotes input at top body assembly 110 and recognizes the group to which each one of said banknotes belongs.

With reference to FIG. 1*b* and FIG. 2, at step 320, for each group, e.g. for each denomination, of banknotes recognized for the banknotes entering the top body assembly 110, the banknote receiving and dispensing device 100 stores the serial number, represented with the letter Z, of the banknote read at step 310 in the memory unit, e.g. in an array 200, of the banknote storing and dispensing module corresponding to the group to which the banknote belongs, e.g. the banknote storing and dispensing module indicated with the reference numeral 125A. As shown in FIG. 1*c*, the array 200 is updated by progressively populating it with the serial numbers of the banknotes, belonging to the respective group, entering the top body assembly 110, where such serial numbers are represented with the letters Z, X, Y, P, and Q. In this way, for each group of banknotes, the banknote serial numbers read at step 310 are stored in a code storage sequence, represented by the array 200 in FIG. 1, that is univocally associated to an expected code dispensing sequence of expected univocal codes, thereby, for the respective banknote storing and dispensing module of each group of banknotes recognized at step 310, the serial number stored in every code position in said code storage sequence 200 is univocally associated to an expected serial number in a corresponding expected code position of the expected code dispensing sequence. In particular, the expected code dispensing sequence can be the reverse of the code storage sequence, and these two sequences can be easily implemented by two respective pointers pointing at location of the memory unit of the respective banknote storing and dispensing module corresponding to the group to which the banknote belongs.

Advantageously, the memory unit is a non-volatile memory unit of each one of the banknotes storing and dispensing modules 125A-125F. In this case, since the code storage sequence and the expected code dispensing sequence univocally associated thereto are stored in the memory unit of each one of the banknote storing and dispensing modules 125A-125F, any one of these modules can be moved to a similar banknote receiving and dispensing device, or it can be replaced by another similar banknote storing and dispensing module, without affecting the operation of the banknote receiving and dispensing device 100. In fact, the processing unit of the banknote receiving and dispensing device 100 can read the code storage sequence and the expected code dispensing sequence, as well as the respective group or type of banknotes, from the memory unit of this substitute banknote storing and dispensing module, even in the case where the latter stores banknotes.

Making reference to FIG. 1*d* and FIG. 2, it is possible to observe that, during a dispensing operation 400 wherein one or more banknotes of a group of banknotes are to be dispensed from the respective banknote storing and dispensing module, e.g. the one indicated with the reference numeral 125A, the output reading device 116 reads at step 410 the serial number of the banknotes to be dispensed. In this way, the serial numbers of the banknotes to be dispensed are read according to a code reading sequence 210 shown in FIG. 1*e*.

At step 420, the processing unit of the banknote receiving and dispensing device 100 compares the serial number read at step 410 with the expected serial number in the position of the expected code dispensing sequence of the respective banknote storing and dispensing module 125A corresponding to the position of the serial number read at step 410 in the code reading sequence 210.

When the comparison at step 420 results in the serial number read at step 410 being equal to the expected serial number, at step 440 the processing unit of the banknote receiving and dispensing device 100 causes the related banknote to be dispensed. Also, as shown in FIG. 1*e*, the processing unit of the banknote receiving and dispensing device 100 deletes both the expected serial number from the expected code dispensing sequence and the serial number stored in the code storage sequence 200 that is univocally associated to the deleted expected serial number, where both the expected code dispensing sequence and the code storage sequence 200 pertain to the respective banknote storing and dispensing module 125A. Then, the processing unit of the banknote receiving and dispensing device 100 returns to execute step 410.

Otherwise, when the comparison at step 420 results in the serial number read at step 410 being different from the expected serial number of the respective banknote storing and dispensing module 125A, at step 430 the processing unit of the banknote receiving and dispensing device 100 causes the banknote to be discarded, because it recognizes the occurrence of a banknote processing disturbance. Afterwards, the processing unit of the banknote receiving and dispensing device 100 continues to discard the subsequent banknotes of the concerned banknote storing and dispensing module 125A, by reading the serial numbers of the discarded banknotes by means of the output reading device 116, until such processing unit recognizes that a subsequence of N serial numbers read from the discarded banknotes, with $N \geq 3$, is identical to a subsequence of N expected serial numbers in the expected code dispensing sequence of the concerned banknote storing and dispensing module 125A starting from a position following the position corresponding to the position of the serial number read at step 410 in the code reading sequence 210. If the processing unit of the banknote receiving and dispensing device 100 recognizes that a subsequence of N serial numbers read from the discarded banknotes is identical to a subsequence of N expected serial numbers in the expected code dispensing sequence, then such processing unit terminates to discard the banknotes and start to dispense them as illustrated above: in other words, the processing unit returns to execute step 410. This implies that, after having identified the occurrence of a banknote processing disturbance, the processing unit of the banknote receiving and dispensing device 100 discards the banknotes seeking for a subsequence of N serial numbers read from the discarded banknotes that is identical to a subsequence of N expected serial numbers stored in the expected code dispensing sequence, i.e. a subsequence of N serial numbers read from the discarded banknotes that corresponds to a known subsequence of N serial numbers of banknotes stored in the expected code dispensing sequence:

if the processing unit finds such known subsequence of N serial numbers in the discarded banknotes, then it starts again to dispense banknotes.

Otherwise, if the processing unit does not find such known subsequence of N serial numbers in the discarded banknotes, then it can terminate the dispensing operation, as shown in FIG. 2 with step 450, and it can request for the intervention of an operator who will need to manually remove all the banknote from the banknote storing and dispensing module affected by the disturbance and to restore them therein. Advantageously, the integer N can be not larger than 5, i.e., N≤5.

It should be noted that in other embodiments of the process according to the invention, step 430 can be executed not for all the banknotes stored in the banknote storing and dispensing module affected by the disturbance, but only for a subset of them, namely for a maximum number M of banknotes, among which the processing unit of the banknote receiving and dispensing device 100 seeks for such known subsequence of N serial numbers, still remaining in the scope of protection of the attached claims. In particular, M is larger than N, i.e. M>N, optionally not larger than 20, i.e. M≤20, more optionally not larger than 10, i.e. M≤10.

In further embodiments of the process according to the invention, when at step 430 the processing unit of the banknote receiving and dispensing device 100 finds such known subsequence of N serial numbers in the discarded banknotes, and thus it starts to dispense banknotes again, such processing unit can store the discarded banknotes back in the respective banknote storing and dispensing modules corresponding to the groups to which the discarded banknotes belong. In particular, for each previously discarded banknote, on the basis of data sensed by a reading device, possibly one of the two reading devices 113 and 116, and possibly by other sensors, the processing unit of the banknote receiving and dispensing device 100 recognizes the group to which each one of said previously discarded banknotes belongs and, through such reading device, possibly one of the two reading devices 113 and 116, the serial numbers of the previously discarded banknotes are read. Then, for each group, e.g. for each denomination, of banknotes recognised for the previously discarded banknotes, the banknote receiving and dispensing device 100 stores the serial number in the memory unit, e.g. in the array, i.e. in the code storage sequence, of the banknote storing and dispensing module corresponding to the group to which the previously discarded banknote belongs: such array is updated by progressively populating it with the serial numbers of the previously discarded banknotes, belonging to the respective group. As mentioned, such code storage sequence is univocally associated to the corresponding expected code dispensing sequence of expected univocal codes.

In particular, the processing unit of the banknote receiving and dispensing device 100 can store the discarded banknotes back in the respective banknote storing and dispensing modules either before or after returning to executing step 410, when it starts to dispense banknotes again.

In other embodiments of the process according to the invention, the processing unit of the banknote receiving and dispensing device 100 can execute step 400, and possibly the step of recognizing the group to which each one of the discarded banknotes belongs and reading sequentially the serial number from each one of the discarded banknotes in a recycling station, possibly provided with at least one reading device, with which the banknote receiving and dispensing device 100 is provided.

As already mentioned, the process for self-recovering from document processing disturbances according to the invention, as well the related flexible document storing and dispensing module and flexible document receiving and dispensing device, are applicable not only to banknotes, but also to any other type of flexible documents, including paper documents such as checks, notes, certificates and licenses, still remaining within the scope of protection of the present invention defined by the attached claims.

Also, the univocal code by which each flexible document, e.g., a banknote, is individually identified can be also different from a serial number, for instance it can be any univocal symbol readable by optically or magnetically or electronically or radiofrequency reading device.

The preferred embodiments of this invention have been described and a number of variations have been suggested hereinbefore, but it should be understood that those skilled in the art can make other variations and changes without so departing from the scope of protection thereof, as defined by the attached claims.

That which is claimed is:

1. A process for self-recovering from document processing disturbances in a flexible document receiving and dispensing device comprising one or more flexible document storing and dispensing modules, wherein each one of said one or more flexible document storing and dispensing modules is configured to store a respective group of flexible documents, wherein each flexible document is individually identified by a univocal code associated thereto, wherein the process comprises the following steps:

A. during a storing operation wherein one or more flexible documents are stored in at least one respective flexible document storing and dispensing module of said one or more flexible document storing and dispensing modules, wherein said one or more flexible documents are stored according to the following substeps:

A.1 recognizing the group to which each one of said one or more flexible documents belongs and reading the univocal code from each one of said one or more flexible documents; and A.2 for each group of flexible documents recognized at step A.1, storing the univocal codes read at step A. 1 from said one or more flexible documents in a memory unit of the respective flexible document storing and dispensing module, whereby the univocal codes read at step A. 1 from said one or more flexible documents are stored in a code storage sequence univocally associated to an expected code dispensing sequence including one or more expected univocal codes, thereby, for the respective flexible document storing and dispensing module of each group of flexible documents recognized at step A.1, the univocal code stored in every code position in said code storage sequence is univocally associated to an expected univocal code in a corresponding expected code position of the expected code dispensing sequence, whereby the code storage sequence and the expected code dispensing sequence for the respective flexible document storing and dispensing module of each group of flexible documents recognised at step A.1 are progressively populated with the univocal codes read at step A.1 for one or more flexible documents of the respective group of flexible documents;

B. during a dispensing operation wherein one or more flexible documents of a group of flexible documents are to be dispensed from the respective flexible document storing and dispensing module, for each one of said one or more flexible documents to be dispensed, performing the following substeps:

B.1 reading the univocal code from the flexible document to be dispensed, thereby the univocal codes of said one or more flexible documents to be dispensed are read according to a code reading sequence, B.2 comparing the univocal code read at step B.1 with a reference univocal code that is the expected univocal code in the position of the expected code dispensing sequence corresponding to the position of the univocal code read at step B.1 in the code reading sequence;

B.3 when the comparison at step B.2 results in the univocal code read at step B.1 being different from the expected univocal code, discarding flexible documents from the respective flexible document storing and dispensing module, by reading the univocal codes of the discarded flexible documents, until it is recognized that a subsequence of N univocal codes read from the discarded flexible documents, with N≥3, is identical to a subsequence of N expected univocal codes in the expected code dispensing sequence starting from a position following the position corresponding to the position of the univocal code read at step B.1 in the code reading sequence, and in the case where discarding is terminated returning to step B.1, otherwise B.4 when the comparison at step B.2 results in the univocal code read at step B.1 being equal to the expected univocal code, dispensing the flexible document, deleting both said expected univocal code from the expected code dispensing sequence and the univocal code stored in said code storage sequence that is univocally associated to said deleted expected univocal code, and returning to step B.1.

2. The process for self-recovering from document processing disturbances according to claim 1, wherein N is ≤5.

3. The process for self-recovering from document processing disturbances according to claim 1, wherein step B.3, when the comparison at step B.2 results in the univocal code read at step B.1 being different from the expected univocal code, is executed for a maximum number M of flexible documents stored in the respective flexible document storing and dispensing module, wherein M is larger than N, and M is not larger than 20.

4. The process for self-recovering from document processing disturbances according to claim 1, wherein, when at step B.3 it is recognized that no subsequence of N univocal codes read from the discarded flexible documents is identical to a subsequence of N expected univocal codes in the expected code dispensing sequence starting from a position following the position corresponding to the position of the univocal code read at step B.1 in the code reading sequence, the dispensing operation is terminated.

5. The process for self-recovering from document processing disturbances according to claim 1, further including, when at step B.3 it is recognized that a subsequence of N univocal codes read from the discarded flexible documents is identical to a subsequence of N expected univocal codes in the expected code dispensing sequence starting from a position following the position corresponding to the position of the univocal code read at step B.1 in the code reading sequence, the following step:

C. storing said discarded flexible documents back in at least one respective flexible document storing and dispensing module of said one or more flexible document storing and dispensing modules, wherein said discarded flexible documents are stored according to the following substeps:

C.1 recognizing the group to which each one of said discarded flexible documents belongs and reading the univocal code from each one of said discarded flexible documents; and C.2 for each group of flexible documents recognized at step C.1, storing the univocal codes read at step C.1 from said discarded flexible documents in a memory unit of the respective flexible document storing and dispensing module, whereby, the univocal codes read at step C.1 from said discarded flexible documents are stored in said code storage sequence univocally associated to said expected code dispensing sequence, thereby, for the respective flexible document storing and dispensing module of each group of discarded flexible documents recognised at step C.1, said code storage sequence and said expected code dispensing sequence for the respective flexible document storing and dispensing module of each group of discarded flexible documents recognized at step C.1 are progressively populated with the univocal codes read at step C.1 for the discarded flexible documents of the respective group of flexible documents.

6. The process for self-recovering from document processing disturbances according to claim 1, wherein said flexible documents comprises banknotes.

7. The process for self-recovering from document processing disturbances according to claim 6, wherein said univocal codes comprise banknote serial numbers printed on said banknotes.

8. A flexible document storing and dispensing module, configured to store in and dispense from a storage unit a group of flexible documents under control of an external processing unit, wherein each one of said flexible documents is individually identified by a univocal code associated thereto, wherein the flexible document storing and dispensing module includes a memory unit wherein:

during a storing operation wherein one or more flexible documents are stored in said flexible document storing and dispensing module, said memory unit is configured to receive the univocal code of each one of said one or more flexible documents and to store the univocal codes of said one or more flexible documents in a code storage sequence univocally associated to an expected code dispensing sequence including one or more expected univocal codes, thereby the univocal code stored in every code position in said code storage sequence is univocally associated to an expected univocal code in a corresponding expected code position of the expected code dispensing sequence, whereby the code storage sequence and the expected code dispensing sequence are progressively populated with the received univocal codes of said one or more flexible documents; and during a dispensing operation wherein one or more flexible documents are to be dispensed from the flexible document storing and dispensing module, for each one of said one or more flexible documents to be dispensed, said memory unit is configured to be accessed to output the expected univocal codes of the expected code dispensing sequence and to delete both said expected univocal codes from the expected code dispensing sequence and the univocal codes stored in said code storage sequence which are univocally associated to each other.

9. The flexible document storing and dispensing module according to claim 8, wherein said memory unit is configured to receive the univocal code of each one of at least N flexible documents from a reading device or said external processing unit.

10. The flexible document storing and dispensing module according to claim 8, wherein said flexible documents comprises banknotes.

11. The flexible document storing and dispensing module according to claim 10, wherein said univocal codes comprise or consist of banknote serial numbers printed on said banknotes.

12. The flexible document storing and dispensing module according to claim 8, wherein said storage unit comprises a storage cassette configured to store said flexible documents in at least one stack.

13. The flexible document storing and dispensing module according to claim 8, wherein said storage unit comprises at least one storage roller configured to store said flexible documents wrapped onto the storage roller.

14. A flexible document receiving and dispensing device comprising:

a top body assembly configured to receive and dispense flexible documents including at least one reading device, and a bottom body assembly configured to store flexible documents, the bottom body assembly comprising a safe having one or more lodgments and a transport mechanism for storing and dispensing flexible documents, wherein said one or more lodgments include respective one or more flexible document storing and dispensing modules, is configured to store in and dispense from a storage unit a group of flexible documents under control of an external processing unit, wherein each one of said flexible documents is individually identified by a univocal code associated thereto, wherein the flexible document storing and dispensing module includes a memory unit wherein:

during a storing operation wherein one or more flexible documents are stored in said flexible document storing and dispensing module, said memory unit is configured to receive the univocal code of each one of said one or more flexible documents and to store the univocal codes of said one or more flexible documents in a code storage sequence univocally associated to an expected code dispensing sequence including one or more expected univocal codes, thereby the univocal code stored in every code position in said code storage sequence is univocally associated to an expected univocal code in a corresponding expected code position of the expected code dispensing sequence, whereby the code storage sequence and the expected code dispensing sequence are progressively populated with the received univocal codes of said one or more flexible documents; and during a dispensing operation wherein one or more flexible documents are to be dispensed from the flexible document storing and dispensing module, for each one of said one or more flexible documents to be dispensed, said memory unit is configured to be accessed to output the expected univocal codes of the expected code dispensing sequence and to delete both said expected univocal codes from the expected code dispensing sequence and the univocal codes stored in said code storage sequence which are univocally associated to each other.

wherein the flexible document receiving and dispensing device further comprises a processing unit operatively connected to said at least one reading device and to said memory unit of said at least one of said one or more flexible document storing and dispensing modules, wherein the flexible document receiving and dispensing device is configured to execute, under control of said processing unit, a process for self-recovering from document processing disturbances in a flexible document receiving and dispensing device, wherein the process comprises the following steps:

A. during a storing operation wherein one or more flexible documents are stored in at least one respective flexible document storing and dispensing module of said one or more flexible document storing and dispensing modules, wherein said one or more flexible documents are stored according to the following sub steps:

A.1 recognizing the group to which each one of said one or more flexible documents belongs and reading the univocal code from each one of said one or more flexible documents; and A.2 for each group of flexible documents recognized at step A.1, storing the univocal codes read at step A.1 from said one or more flexible documents in a memory unit of the respective flexible document storing and dispensing module, whereby the univocal codes read at step A.1 from said one or more flexible documents are stored in a code storage sequence univocally associated to an expected code dispensing sequence including one or more expected univocal codes, thereby, for the respective flexible document storing and dispensing module of each group of flexible documents recognised at step A.1, the univocal code stored in every code position in said code storage sequence is univocally associated to an expected univocal code in a corresponding expected code position of the expected code dispensing sequence, whereby the code storage sequence and the expected code dispensing sequence for the respective flexible document storing and dispensing module of each group of flexible documents recognised at step A.1 are progressively populated with the univocal codes read at step A.1 for one or more flexible documents of the respective group of flexible documents:

B. during a dispensing operation wherein one or more flexible documents of a group of flexible documents are to be dispensed from the respective flexible document storing and dispensing module, for each one of said one or more flexible documents to be dispensed, performing the following sub steps:

B.1 reading the univocal code from the flexible document to be dispensed, thereby the univocal codes of said one or more flexible documents to be dispensed are read according to a code reading sequence, B.2 comparing the univocal code read at step B.1 with a reference univocal code that is the expected univocal code in the position of the expected code dispensing sequence corresponding to the position of the univocal code read at step B.1 in the code reading sequence:

B.3 when the comparison at step B.2 results in the univocal code read at step B.1 being different from the expected univocal code, discarding flexible documents from the respective flexible document storing and dispensing module, by reading the univocal codes of the discarded flexible documents, until it is recognized that a subsequence of N univocal codes read from the discarded flexible documents, with N≥3, is identical to a subsequence of N expected univocal codes in the expected code dispensing sequence starting from a position following the position corresponding to the position of the univocal code read at step B.1 in the code reading sequence, and in the case where discarding is terminated returning to step B.1, otherwise B.4 when the comparison at step B.2 results in the univocal code read at step B.1 being equal to the expected univocal code, dispensing the flexible document, deleting both said expected univocal code from the expected code dispensing sequence and the univocal code stored in said code storage sequence that is univocally associated to said deleted expected univocal code, and returning to step B.1.

15. The flexible document receiving and dispensing device according to claim 14, further comprising a recycling station, within which said processing unit is configured to execute step B and a sub step C.1 of recognizing the group to which each one of said discarded flexible documents belongs and reading the univocal code from each one of said discarded flexible documents.

16. The flexible document receiving and dispensing device according to claim 15, wherein said recycling station is provided with at least one reading device.

* * * * *